US008731390B2

(12) United States Patent
Goldenberg et al.

(10) Patent No.: US 8,731,390 B2
(45) Date of Patent: May 20, 2014

(54) ELECTROMAGNETIC ACTUATORS FOR DIGITAL CAMERAS

(71) Applicant: Corephotonics Ltd., Tel-Aviv (IL)

(72) Inventors: Ephraim Goldenberg, Ashdod (IL); Gal Shabtay, Tel-Aviv (IL); Eliezer Mendlovic, Tel Aviv (IL); Eran Kali, Jerusalem (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 13/983,304

(22) PCT Filed: Jan. 7, 2013

(86) PCT No.: PCT/IB2013/050130
§ 371 (c)(1),
(2), (4) Date: Aug. 2, 2013

(87) PCT Pub. No.: WO2013/105012
PCT Pub. Date: Jul. 18, 2013

(65) Prior Publication Data
US 2014/0063331 A1    Mar. 6, 2014

Related U.S. Application Data

(60) Provisional application No. 61/585,795, filed on Jan. 12, 2012.

(51) Int. Cl.
*G03B 3/10* (2006.01)
(52) U.S. Cl.
USPC ............ 396/133; 335/219; 335/220; 359/824

(58) Field of Classification Search
CPC .................................. G03B 3/10; G02B 7/09
USPC .................................. 396/133; 335/219, 220
See application file for complete search history.

(56) References Cited

U.S. PATENT DOCUMENTS 4,291,958 A * 9/1981 Frank et al. ................... 396/133
(Continued)

FOREIGN PATENT DOCUMENTS

JP    S54 104826    8/1979
JP    2005 284212   10/2005

OTHER PUBLICATIONS

PCT/IB2013/050130 Search Report of the international search authority, Jun. 2013.

*Primary Examiner* — W B Perkey
(74) *Attorney, Agent, or Firm* — Nathan & Associates Patent Agents Ltd.; Menachem Nathan

(57) ABSTRACT

Electromagnetic actuators for digital cameras, in particular miniature cell-phone and tablet cameras, include an electromagnet with a first elongated ferromagnetic member surrounded coaxially in part by a conductive coil along a first longitudinal axis, and a elongated second ferromagnetic member with a second longitudinal axis. The first and second ferromagnetic members have respective first and second operative surfaces and are aligned such that their longitudinal axes are parallel and such that respective operative surfaces overlap each other across a gap. The two members are mechanically coupled to respective frames. A frame hinge connects the frames and enables a relative tilt motion between the ferromagnetic members when current passes through the coil. The tilt motion is convertible into a linear displacement along an optical axis of an optical element coupled to the actuator. Two actuators can be combined into an assembly capable of providing double-axis tilt.

27 Claims, 12 Drawing Sheets

(56) References Cited

U.S. PATENT DOCUMENTS

| | | |
|---|---|---|
| 2007/0223903 A1 | 9/2007 | Ho et al. |
| 2010/0232042 A1* | 9/2010 | Terajima .................. 359/824 |
| 2011/0148554 A1 | 6/2011 | Cho et al. |
| 2011/0236009 A1* | 9/2011 | Murakami et al. ............ 396/133 |
| 2013/0128099 A1* | 5/2013 | Gutierrez et al. ............. 348/349 |
| 2014/0063331 A1* | 3/2014 | Goldenberg et al. ......... 348/357 |

* cited by examiner

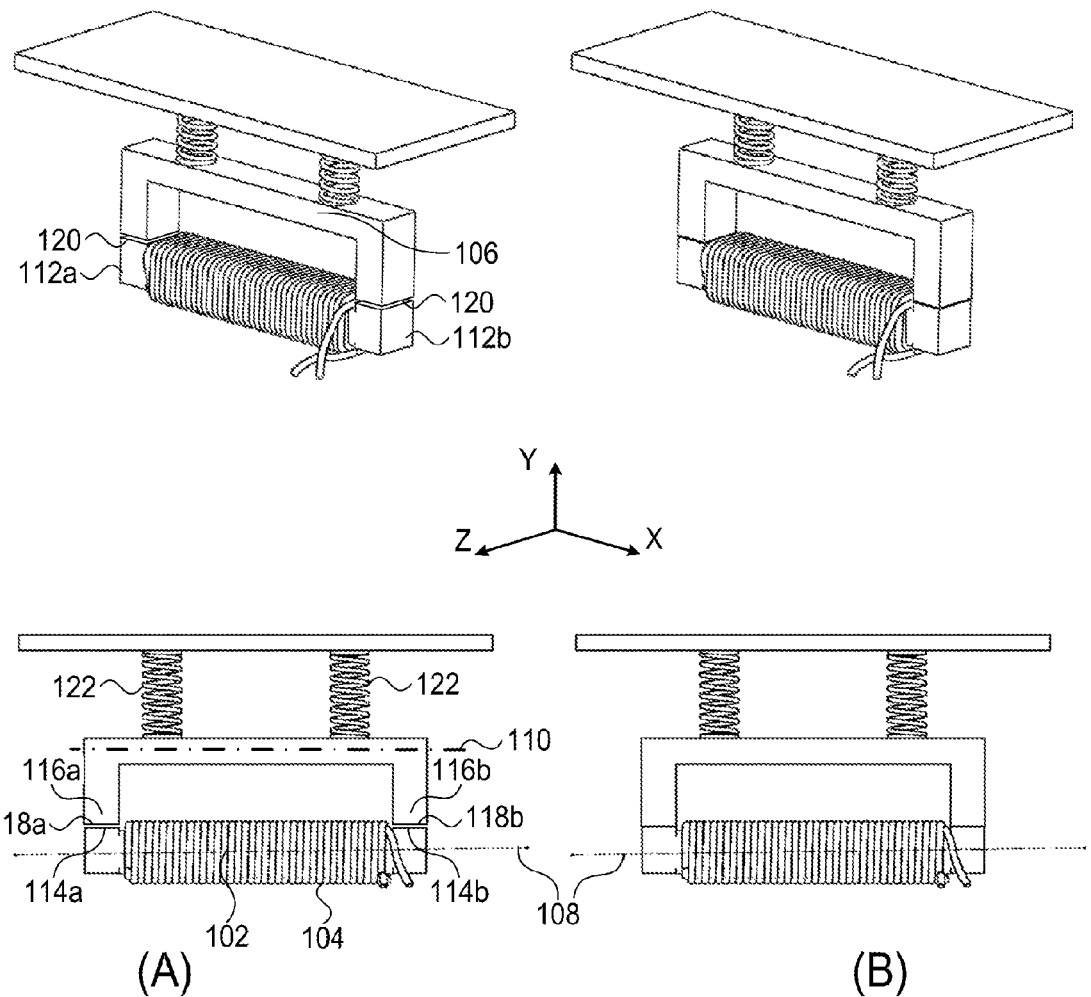
FIG. 1 "KNOWN ART"

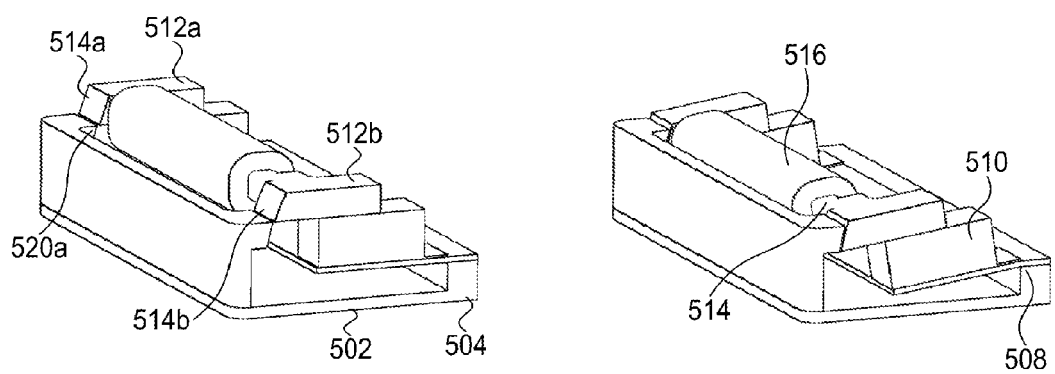
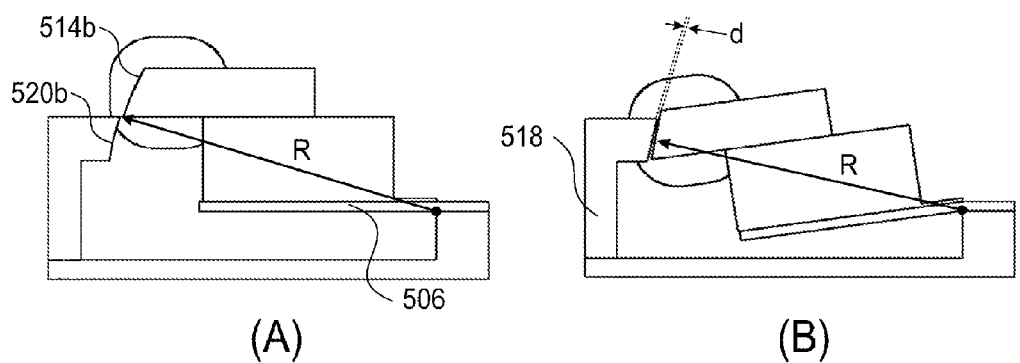
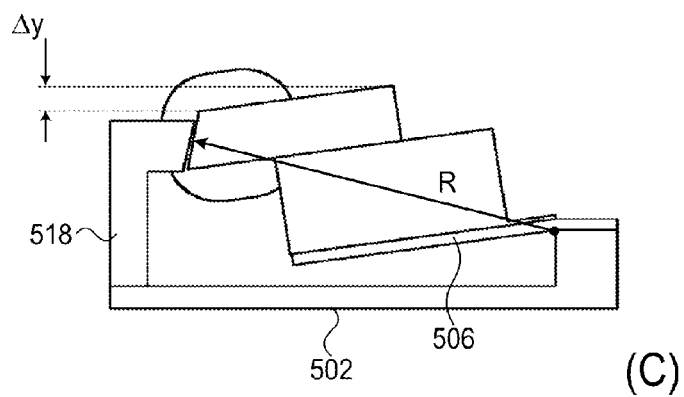
FIG. 5

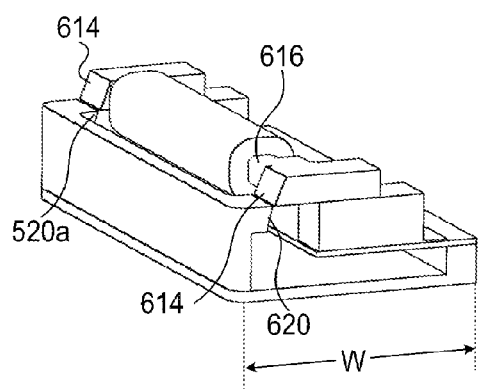
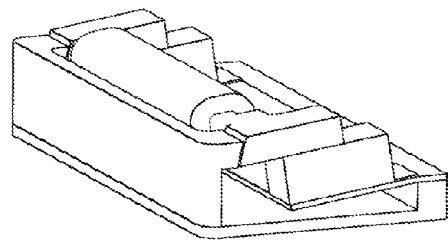
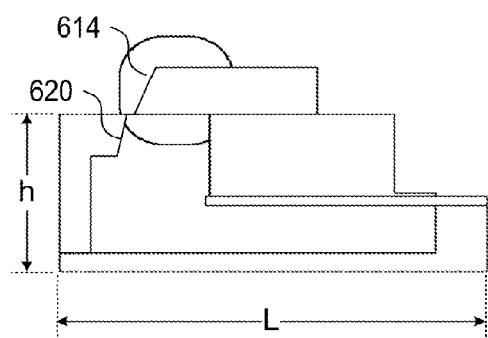
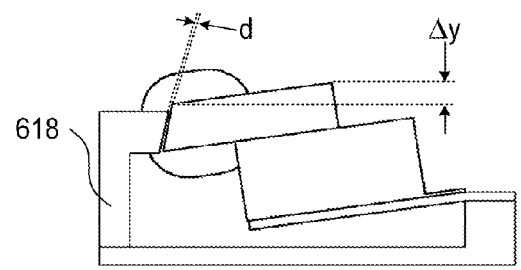
(A)   (B)
FIG. 6

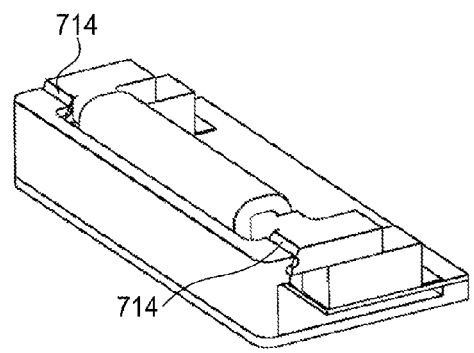
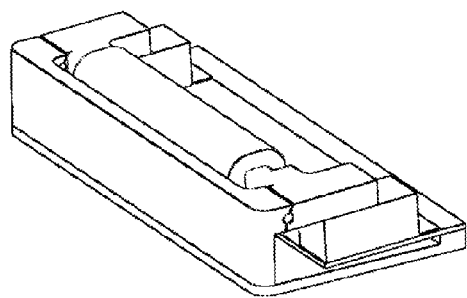
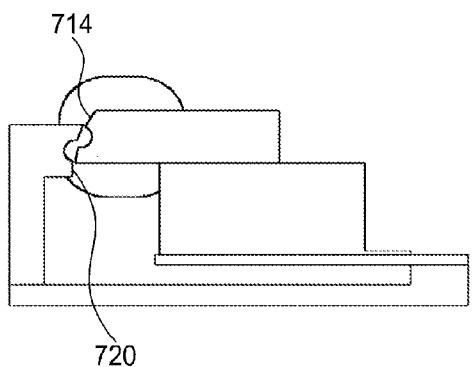
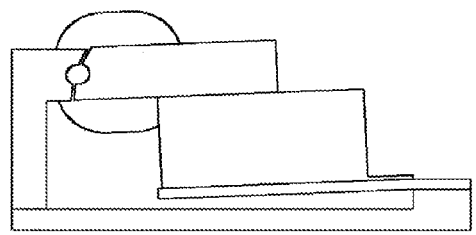
(A)            (B)
FIG. 7

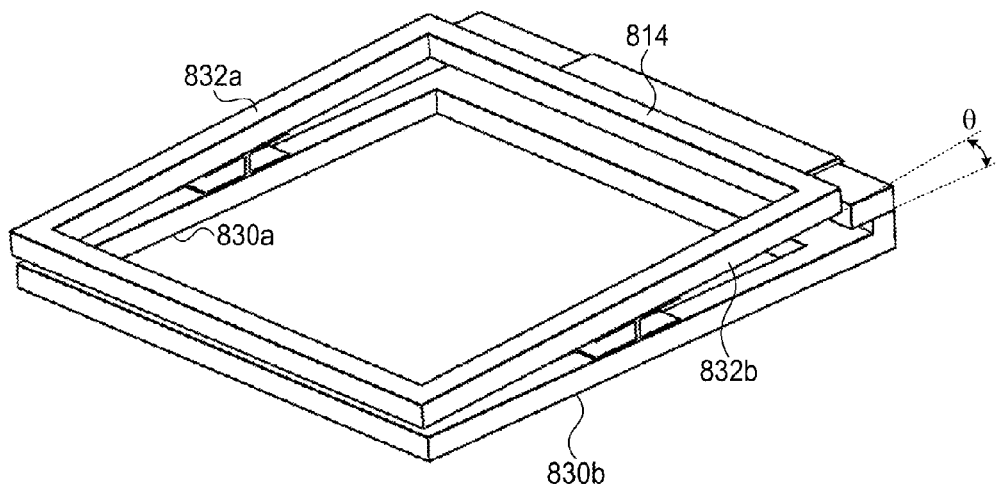
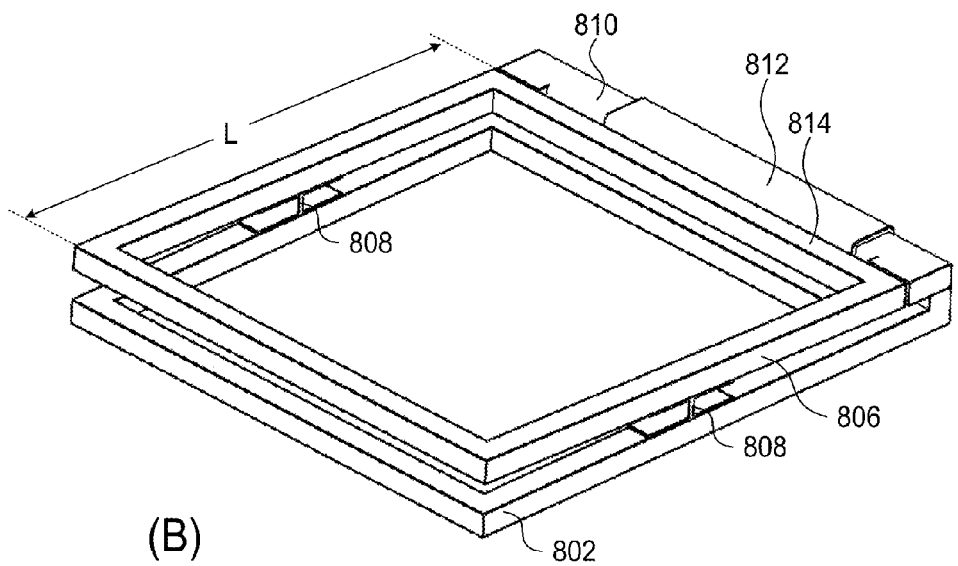
FIG. 8

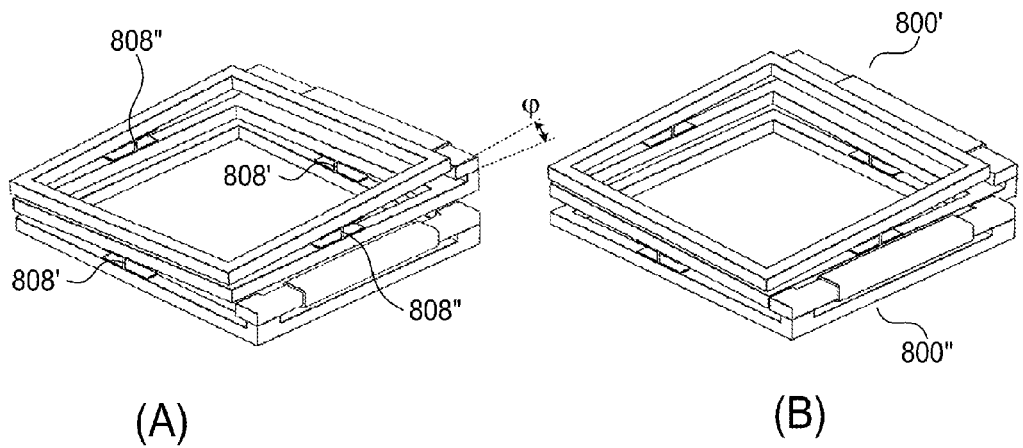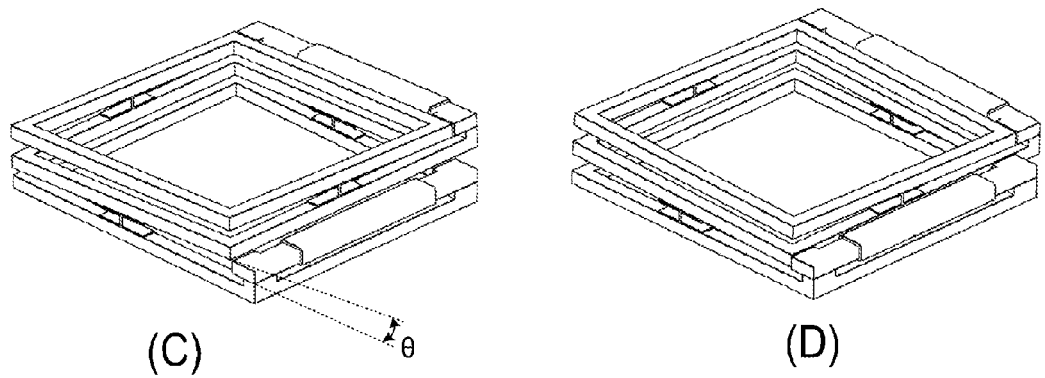
FIG. 9

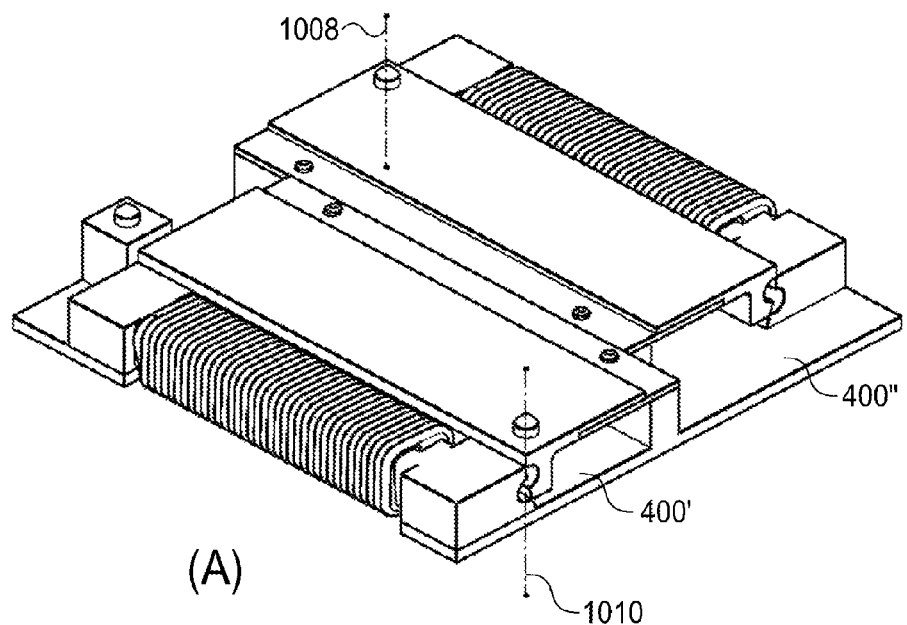
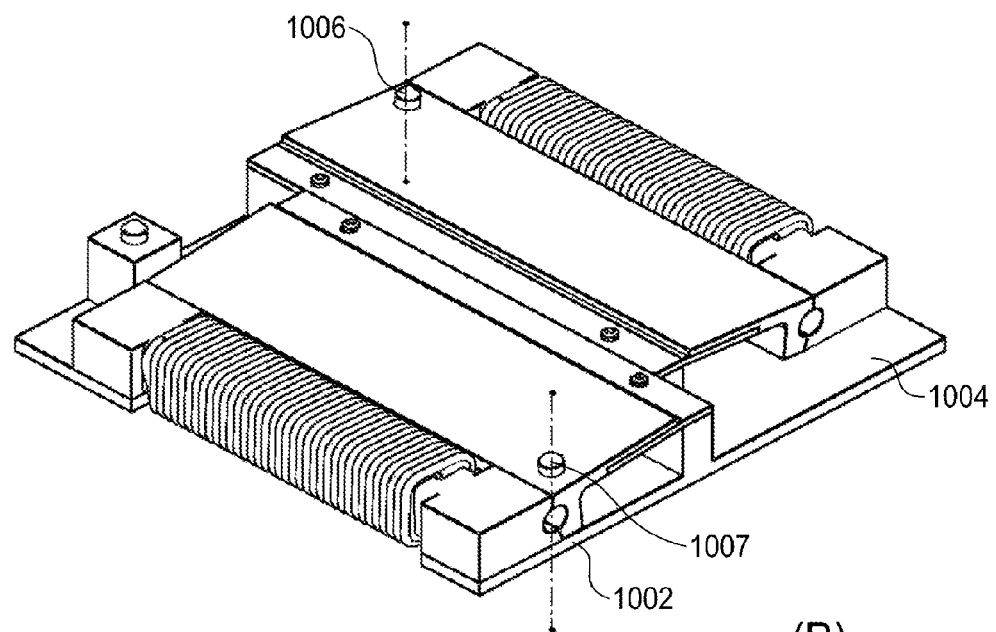
FIG. 10

ELECTROMAGNETIC ACTUATORS FOR DIGITAL CAMERAS

CROSS REFERENCE TO RELATED APPLICATIONS

This application is related to and claims priority from U.S. Provisional Patent Application No. 61/585,795 titled "Magnetic Actuator" and filed Jan. 12, 2012, which is incorporated herein by reference in its entirety.

FIELD

Embodiments disclosed herein relate in general electromagnetic (EM) actuators having ferromagnetic members and conductive coils and more particularly to EM actuators used in miniature cameras.

BACKGROUND

In its basic form, an electronic camera, such as digital still camera or a camera embedded in a mobile (cell) phone or in a tablet computer includes two components: (1) a lens module comprising a set of one or more plastic or glass lens elements and used to create an optical image of the viewed scene, and (2) an image sensor (e.g., CMOS or CCD), which converts the optical image to the electronic domain, where the image can be processed and stored. There are different types of electronic (or digital) cameras ranging by application (e.g., regular SLR, camera-phone, automotive, security and medical) and by functionality (e.g., with or without auto-focus). The simplest cameras are those in which the lens module is fixed in position with respect to the image sensor. These cameras are often called fixed-focus cameras, where the camera is focused to a pre-determined distance. Objects that fall within the depth of field of the camera can be captured sharply and those which fall beyond the depth of field will be blurred. In more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity.

Some advanced camera designs may include different groups of lenses that can move with respect to each other and hence change the effective focal length of the camera, which results in optical zoom capability. The trend in digital still cameras is to increase the zooming capabilities (e.g. to 5×, 10× or more) and, in cellphone cameras, to decrease the pixel size and increase the pixel count. These trends result in greater sensitivity to hand-shake or in a need for longer exposure time. This has created a need for optical image stabilization (OIS), which now appears in advanced cameras. In OIS-enabled cameras, the lens or camera module can change its lateral position or tilt angle in a fast manner to cancel the hand-shake during the image capture.

In compact (miniature) camera modules, the most ubiquitous form of an actuator is the Voice-Coil Motor (VCM), which includes a coil (wire turned on a cylinder), fixed (or "permanent" or "hard") magnets and springs. When current is driven through the coil, an electro-magnetic (EM) force is applied and the lens module changes position. While the VCM is considered a mature technology, it is costly, large in size, uses rare-earth magnets, is slow in operation and consumes high power. Therefore, there is a need for, and it would be advantageous to have technical advances which overcome the shortcomings of VCM and related technologies.

SUMMARY

In various embodiments, there are disclosed EM actuators which can be used in digital (including cell-phone and tablet) cameras where at least one lens element in a lens module and/or an image sensor move to adjust camera focus, stabilize an image, create a super-resolution effect or provide enhanced user experience.

Embodiments disclosed herein teach semi-planar geometry EM actuators for miniature camera auto-focus (AF) and OIS, as well as for any other functionality that can be obtained by tilting or moving a camera module or elements therewithin. The actuator's thickness may be less than half of its large dimension. The actuator moves along the thickness axis. The actuation force is magnetic, using ferromagnetic materials ("soft" magnets). The structure is inspired by the basic reluctance motor scheme. Actuator structures disclosed herein are designed to reduce the magnetic reluctance of the actuator and thereby provide a large EM force. Further, actuators disclosed herein are designed to allow solely one dimensional (1D) tilt of parts within the actuator, thereby enabling accurate and smooth motion while avoiding jamming. Assemblies of two such actuators allow 2D tilts.

In some embodiments, there is provided an EM actuator used to linearly move an optical element along an optical axis, the actuator comprising: a first elongated ferromagnetic member surrounded partially by a conductive coil, the first ferromagnetic member having a first longitudinal axis and a first operative surface; a second elongated ferromagnetic member having a second longitudinal axis parallel to the first longitudinal axis and a second operative surface, the first and second ferromagnetic members disposed such that a gap and an overlap are formed between the first and second operative surfaces; and a frame hinge having a third longitudinal axis parallel to the first and second longitudinal axes, the frame hinge used to enable one ferromagnetic member to undergo a tilt motion relative to the other ferromagnetic member when a magnetic force is generated by current in the coil, the tilt motion convertible into a linear displacement of the optical element from a first position to a second position.

In some embodiments, the operative surface includes two operative surface sections disposed at two opposing ends of each ferromagnetic member.

In some embodiments, the movement between the first and second positions is continuous and provides a third, intermediate position for the optical element.

In some embodiments, the first position corresponds to a maximal overlap and the second position corresponds to a minimal overlap.

In some embodiments, each ferromagnetic member has an extension along its respective longitudinal axis, the extension of the second ferromagnetic member being greater than the extension of the first ferromagnetic member along the first longitudinal axis, so that the first ferromagnetic member is configured for being at least partially contained within the second ferromagnetic member.

In some embodiments, each ferromagnetic member is formed with two operative surfaces spaced and facing away from one another so that when the first ferromagnetic member is at least partially contained within the second ferromagnetic member, the operative surfaces of the first ferromagnetic member face the operative surfaces of the second ferromagnetic member.

In some embodiments, each operative surface is in the form of a fork having a plurality of portions spaced apart by respective gaps, each portion being formed with an operative subsurface.

In some embodiments, the gap and the overlap are formed between first and second operative surface sections defined by flat planes perpendicular to an axis originating at the hinge.

In some embodiments, the gap and the overlap are formed between first and second operative surface sections defined by curved planes having a common radius originating at the hinge.

In some embodiments, one ferromagnetic member is fixedly attached to a first platform, the other ferromagnetic member is fixedly attached to a second platform, and one of the two platforms is movable.

In some embodiments, the platforms are non-ferromagnetic.

In some embodiments, at least one platform is in the form of a frame.

In some embodiments, at least one of the first longitudinal axis and the second longitudinal axis is oriented parallel to the frame.

In some embodiments, at least the movable platform is made of a flexible material which is used to form the common hinge as an integral hinge.

In some embodiments, two actuators are combined to form an actuator assembly which provides a double-axis tilt capability.

In some embodiments, an actuator assembly is configured for controlling focus of the optical device In some embodiments, an actuator assembly is configured for controlling vibration compensation of the optical device.

In some embodiments, an actuator or actuator assembly are implemented in a digital camera.

In some embodiments, the actuator has a height h and the digital camera has a height H wherein H/h>3.

BRIEF DESCRIPTION OF THE DRAWINGS

Non-limiting embodiments are herein described, by way of example only, with reference to the accompanying drawings, wherein:

FIG. 1 shows a known EM actuator in isometric and frontal views in: (A) a relaxed (open) state and (B) a final (closed) operative state;

FIG. 5 shows yet another embodiment of an EM actuator disclosed herein in: (A) isometric and side views of a relaxed state, (B) isometric and side views of a closed operative state, and (C) side view of an intermediate operative state;

FIG. 6 shows yet another embodiment of an EM actuator disclosed herein in: (A) isometric and side views of a relaxed state and (B) isometric and side views of a final operative state;

FIG. 7 shows yet another embodiment of an EM actuator disclosed herein in: (A) isometric and side views of a relaxed state and (B) isometric and side views of a final operative state;

FIG. 8 shows isometric views of yet another embodiment of an EM actuator disclosed herein in: (A) a relaxed state and (B) final operative state;

FIG. 9 shows isometric views of an embodiment of an EM actuator assembly disclosed herein and capable of θ-φ (double-axis) tilting in: (A) an open-open state; (B) an open-closed state; (C) a closed-open state; (D) a closed-closed state;

FIG. 10 shows isometric views of another embodiment of an EM actuator assembly disclosed herein and which can provide double-axis tilting in: (A) an open-open state and (B) a closed-closed state;

DETAILED DESCRIPTION

Figure 2A:
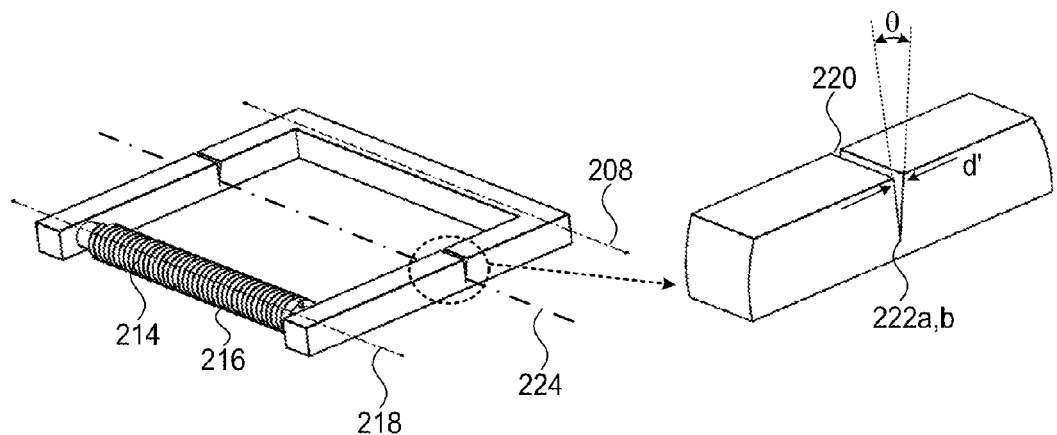
FIG. 2 shows an embodiment of an EM actuator disclosed herein in an isometric view in: (A) a relaxed state and (B) an operative state.

FIG. 1 shows a known EM actuator numbered 100 in isometric and frontal views in: (A) a relaxed (open) state, and (B) a closed operative state. The frontal view is along the −Z axis in an orthogonal X-Y-Z reference frame, which is used throughout the description below. Actuator 100 includes a first elongated ferromagnetic member (also referred to as "core") 102 surrounded partially by a conductive coil 104 and a second elongated ferromagnetic member 106. Core 102 and coil 104 form an electromagnet. The core and coil are coaxial along a first longitudinal axis 108. Member 106 is elongated along a second longitudinal axis 110 which is parallel to axis 108. Core 102 has two end sections 112a and 112b which extend along axis 108 beyond the area covered by the coil. The core end sections are exemplarily similar. End sections 112a and 112b have planar horizontal (X-Z) "operative" surfaces 114a and 114b. Second ferromagnetic member 106 has two end sections 116a and 116b with respective planar horizontal operative surfaces 118a and 118b which face surfaces 114a and 114b across a gap 120 of size "d" and overlap over an area "A". The operative surfaces are shown exemplarily as having rectangular shapes. Other shapes are possible.

In an operative state, FIG. 1B, current applied to the coil develops an EM force F in the Y direction. F is approximately proportional to $A(I \times N)^2/(B+d)^2$ where I is the current, N is the number of coil wire turns and B is a constant which depends on the geometry and material of the device. The magnetic force pulls the two ferromagnetic members toward each other, reducing the gap size and thereby minimizing the magnetic reluctance. Evidently, when the gap is small, F is very large. However, for larger gaps, e.g. gaps satisfying d>B, F decreases quickly as d increases. A counterforce S may be provided by a spring 122. For a particular current, an equilibrium formed between the EM force and the spring force leads to a particular gap size. However, while F is approximately proportional to $1/d^2$, S proportional to 1−d (i.e. is linear). The different dependencies on d lead to two major problems: the range of significant EM force is small, and the gap can collapse. Therefore, the use of such an actuator would be problematic in camera applications.

The problems mentioned may be somewhat alleviated by introducing a ferromagnetic fluid to fill the gap. This can result in a significant reduction in the constants A and C, which in turn reduces the maximal F (when d→0) but increases the usable gap (displacement) range.

Figure 2B:
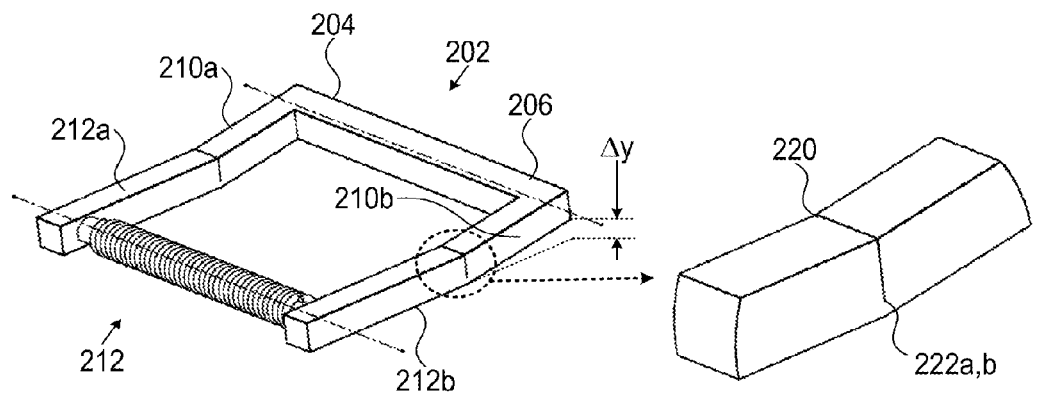

FIG. 2 shows an embodiment of an EM actuator disclosed herein and numbered 200 in an isometric view in: (A) a relaxed state, and (B) a closed operative state. Also shown are details of a "gap and hinge" region. Actuator 200 comprises a ferromagnetic frame 202 includes a U-shaped section 204 having an elongated base member 206 extending along a first longitudinal axis 208 and arms 210a and 210b. Frame 202 further includes a second section 212 which includes arms 212a and 212b. All arms have cross sections A (in essentially the X-Y plane). Arms 212a and 212b are connected through an elongated ferromagnetic member (core) 214 surrounded partially by a coil 216. Core 214 and coil 216 extend along a second longitudinal axis 218 which is parallel with axis 206. Arms 210a and 210b and 212a and 212b are separated by respective V-shaped gaps 220a and 220b except at hinges 222a and 222b which extend along a third longitudinal axis 224, parallel to axes 206 and 218. Each gap 220 is characterized by an angle θ and a top opening of size d'. The gap determines the reluctance of the magnetic circuit. The gap is shaped to allow a relative tilt (pivoting) motion between sections 204 and 212 around hinges 222 through a tilt angle which can vary exemplarily between 0 degrees (for a relaxed or "open" state) and 5 degrees for a closed (minimal reluctance) state. When current passes through coil 216, a "folding" EM force develops in the frame such that member 206 undergoes a displacement Δy in the Y direction relative to core 214 (FIG. 2B). Δy may be along an optical axis. The EM force F is approximately proportional to $A(I \times N)^2/(B+d')^2$. The material in the hinge region has elastic properties and serves as a spring. This configuration has an advantage in that even if the maximal d' is small (which results in a high force) one can achieve a large lateral movement of base member 204.

Figure 3:
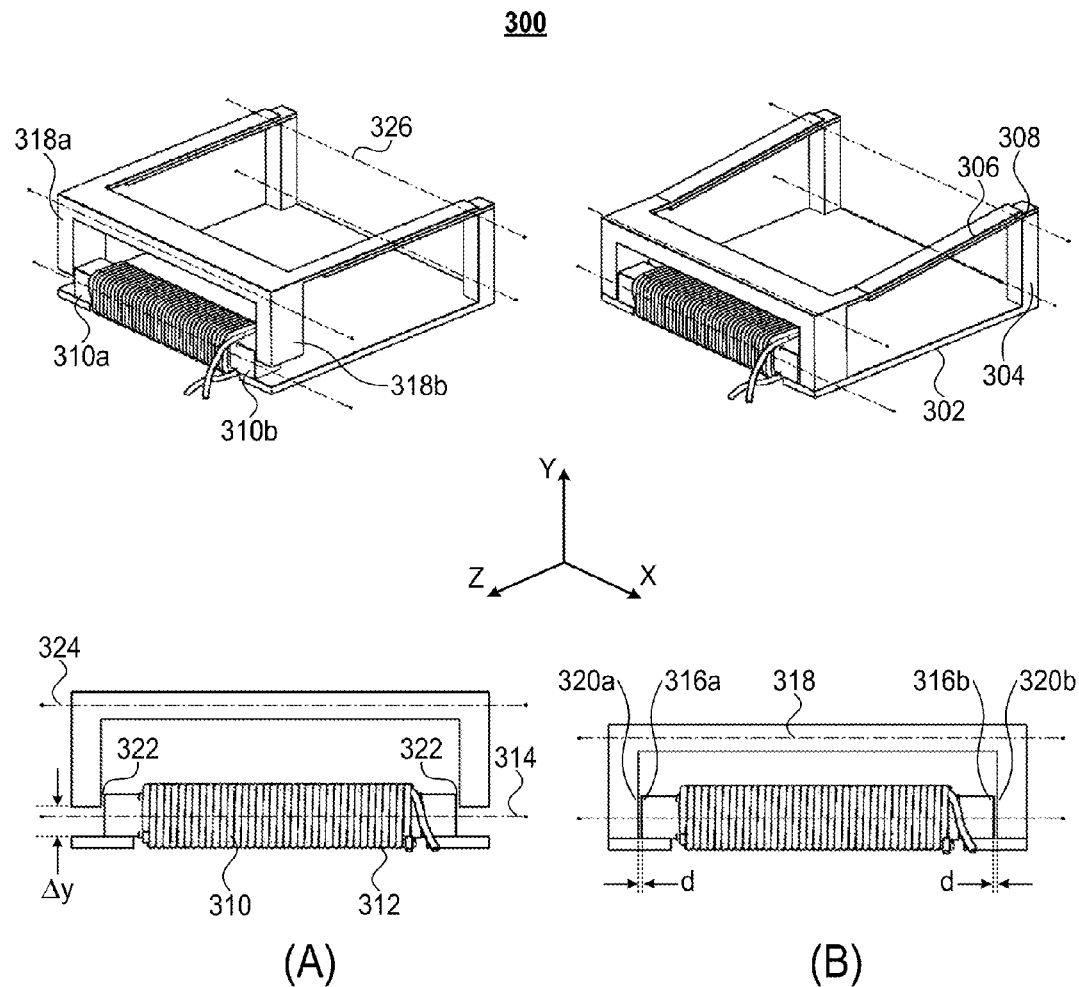
FIG. 3 shows another embodiment of an EM actuator disclosed herein in isometric and frontal views in: (A) a relaxed state and (B) closed operative state.

FIG. 3 shows another embodiment of an EM actuator numbered 300 in isometric and frontal views in: (A) a relaxed (open) state, and (B) a closed operative state. Actuator 300 comprises a U-shape structure with a first planar frame 302, a base section 304, and a second planar frame 306. The two frames are non-ferromagnetic and joined at a frame hinge 308, which may be integral to the structure (see below). The base section and/or hinge material have elastic properties that enable them to act as a spring. Frame 302 is stationary and has attached thereto a first elongated ferromagnetic member (core) 310 surrounded partially by a conductive coil 312. The core and coil extend and are coaxial along a first longitudinal axis 314. The core has two end sections 310a and 310b which extend beyond the area covered by the coil. End sections 310a and 310b have planar vertical (X-Y) operative surfaces 316a and 316b with an overlap depth S (in the Z direction). Exemplarily, S may be about 1 mm. Frame 306 has attached thereto a second ferromagnetic member 318 which extends along a second longitudinal axis 324 and has two end sections 318a and 318b. These end sections have respective planar vertical operative surfaces 320a and 320b. Essentially, the extension of second ferromagnetic member 318 is greater than the extension of first ferromagnetic member 310, so that the first ferromagnetic member is configured for being at least partially contained within the second ferromagnetic member. The pairs of vertical operative surfaces 316a and 320a and 316b and 320b thus face each other across constant gaps 322 of size d.

Frame 306 is movable (can tilt or pivot) around frame hinge 308. Note that hinge 308 (positioned here at ends of "arms" of the frames, arms which are perpendicular to the ferromagnetic members) extends along a third longitudinal axis 326. Axis 326 is parallel to axes 314 and 324. An overlap area between operative surfaces is defined by depth S multiplied by a displacement Δy in the Y direction, i.e. by SΔy. Δy may vary exemplarily between 0 and 500 µm. In a typical application involving cameras, actuator 300 and others disclosed below may be connected to an optical lens which will in turn undergo a similar displacement upon actuation.

Note that a U-shape shown is exemplary. Other shapes which allow a relative tilt between two frames around a common frame hinge (such as a V-shape, an intermediate shape between a U-shape and a V-shape, and more generally partially curved frame shapes which keep the longitudinal axes of the two ferromagnetic members parallel) may be used for purposes set forth herein. Also note that the use of frames to support the ferromagnetic members and to provide the tilt movement capability through their connection to a common hinge is exemplary, and that full plates (see FIG. 10) or other types of platforms may replace the frames. Further note that a hinge may be formed by local structural or mechanical changes in the same material used for the frames. That is, a frame may be locally (in a narrow area around the hinge longitudinal axis) thinned or its mechanical/elastic properties changed so that it becomes more flexible in that area. Such a hinge is referred to as an "integral" hinge.

All following actuator embodiments have first and second ferromagnetic members and hinges with parallel longitudinal axes. Also, electromagnet core end sections with operative surfaces extend beyond the coil in all embodiments. Therefore, these facts are not described further but can be seen in the drawings.

A current applied to coil 312 develops an EM force F in the Y direction approximately proportional to $S(I \times N)^2/(B+d)$. The force causes the operative surfaces to slide relative to each other, changing the overlap area but leaving d constant. The overlap is minimal in the relaxed ("open") state, FIG. 3A, and, in an operative state, increases with I to a maximal overlap (FIG. 3B) which represents a "closed" state. To a first approximation, the EM force in this configuration depends essentially only on the current (i.e. is independent of position). This provides easier control of the position (actuation state) than for example in actuator 100.

Figure 4:
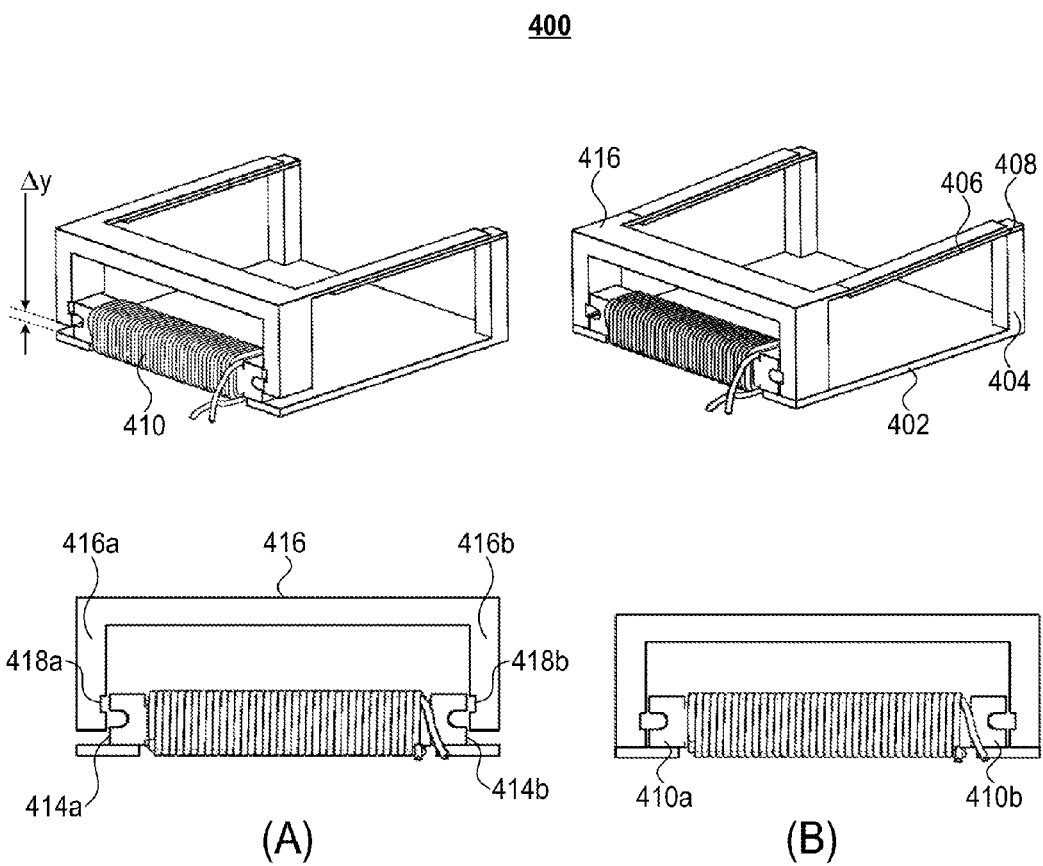
FIG. 4 shows another embodiment of an EM actuator disclosed herein in isometric and frontal views in: (A) a relaxed state and (B) closed operative state.

FIG. 4 shows another embodiment of an EM actuator disclosed herein and numbered 400 in isometric and frontal views in: (A) a relaxed (open) state, and (B) a closed operative state. Actuator 400 is similar to actuator 300, i.e. it has exemplarily a U-shape structure with a first fixed planar frame 402, a base section 404, and a second movable planar frame 406. Frames 402 and 406 are joined at a common hinge 408. Actuator 400 differs from actuator 300 in that a first elongated ferromagnetic member 410 has end sections 410a and 410b with "forked" vertical surfaces 414a and 414b. End sections 416a and 416b in a second ferromagnetic member 416 have respective forked vertical surfaces 418a and 418b. Each forked surface has two "prongs" (each prong having an operative "sub-surface"). Respective operative sub-surfaces of opposite members (414 and 418) are separated by gaps of size d. Opposing (across the gap) operative surfaces overlap over a depth S. For two-prong forks, the overlap area between operative surfaces is 2SΔy, i.e. double the one obtained with actuator 300. The fork geometry provides effectively two operative sub-surfaces for each ferromagnetic member, and this allows having doubled force (and magnetic reluctance) compared to that in actuator 300 for the same vertical displacement.

FIG. 5 shows yet another embodiment of an EM actuator disclosed herein and numbered 500 in: (A) isometric and side views of a relaxed state, (B) isometric and side views of a final operative state, and (C) a side view of an intermediate operative state. In principle, actuator 500 is similar to actuators 300 and 400 in that it is based on a framed structure capable of tilting around a hinge. However, in actuator 500, the movable member includes the electromagnet, in contrast with actuators 300 and 400 in which the tilting member is the opposite ferromagnetic member. Also, operative surfaces in actuator 500 (as well as others below) are in planes substantially parallel to the longitudinal axes, in contrast with actuators 300 and 400, in which they are substantially perpendicular to such axes. Actuator 500 includes exemplarily a U-shape structure with a first frame 502, a base section 504 and a second planar frame 506. The frames and base section are non-ferromagnetic. Frame 506 has attached thereto a first surface of a non-ferromagnetic spacer 510. Spacer 510 has attached thereto at a second, opposite surface, two ferromagnetic arms 512a and 512b with respective operative end surfaces 514a and 514b. Arms 512a and 512b are connected through an elongated ferromagnetic member (core) 514 surrounded partially by a coil 516. Frame 502 has attached thereto a vertical ferromagnetic member 518 (similar to member 318 in FIG. 3) with two end sections 518a and 518b. End sections 518a and 518b have respective operating end surfaces 520a and 520b. Surfaces 520a and 520b face respectively surfaces 514a and 514b across constant gaps of size d. Operative surfaces 514a and 514b have a curvature with radius R, where R originates at common hinge 508. Exemplarily, R is 3 mm. Operative surfaces 520a and 520b have a matching curvature with respectively radii R and (R+d). Opposing (across the gap) operative surfaces overlap over a depth S. A relative tilt movement between the operative surfaces of opposing ferromagnetic members keeps the gap constant while changing an overlap area.

As in actuator 300, a current applied to coil 516 develops an EM force which depends essentially only on the current. The operative surfaces slide relative to each other with a displacement Δy occurring in the Y direction. In some camera embodiments, Δy may vary between 0 and 500 μm or between 0 and 1000 μm. In other embodiments, Δy may vary between 0 and 1000 μm. The displacement provides an overlap area SΔy. The overlap area is minimal in the relaxed state, FIG. 5A, and increases in an operative state to a maximal overlap, FIG. 5B, which represents a "closed state".

FIG. 6 shows yet another embodiment of an EM actuator disclosed herein and numbered 600 in: (A) isometric and side views of a relaxed state, and (B) isometric and side views of a final operative state. Actuator 600 is shown with exemplary dimensions of length L of 3.5 mm, width W of 8 mm, height h (along an optical axis) of 2 mm, radius R of 3 mm and a gap d of 15 μm for the position in which the operative surfaces are parallel. In this embodiment, opposing operative surfaces overlap over a depth S which is exemplarily 0.9 mm. Actuator 600 is similar to actuator 500, except that operative surfaces 614 (on a moving ferromagnetic member 616) and operative surfaces 620 (on a stationary ferromagnetic member 618) approximate flat planes instead of arcs. Surfaces 614 and 620 actually represent two operative surfaces of the same ferromagnetic member, as in FIG. 5. In contrast with gaps in actuator 500, the gap between opposing operative surfaces 614 and 620 is not constant over the range of Δy displacements between a relaxed (open) state (FIG. 6A) and a fully operative (closed) state (FIG. 6B). Nevertheless, the change in gap width is tolerable over an operating range of displacements (for example, d varies from a minimum of 15 μm to a maximum of 25 μm).

FIG. 7 shows yet another embodiment of an EM actuator disclosed herein and numbered 700 in: (A) isometric and side views of a relaxed state, and (B) isometric and side views of a final operative state. Actuator 700 is similar to actuators 500 or 600 (i.e. it can have either flat or curved operative surfaces), except that its operative surfaces 714 and 720 are forked as in actuator 300 (and thus provide similar sub-surfaces). Its operation is similar to that of actuators 500 and 600, with the sub-surfaces providing doubled force (and magnetic reluctance) compared to that in actuators 500 or 600 for the same vertical displacement.

FIG. 8 shows isometric views of yet another embodiment of an EM actuator disclosed herein and numbered 800 in: (A) a relaxed state and (B) a final operative state. Actuator 800 is similar to previously described actuators disclosed herein, having two frames 802 and 806 with respective arms 830a, 830b and 832a and 832b. The frames are coupled at frame hinges 808 positioned at some point (e.g. centered) along of the length of the arms. The ferromagnetic members (e.g. a first member 810 with surrounding coil 812 and a parallel second member 814) are perpendicular to the arms. The displacement Δy depends on the hinge position and on the length of the arms L. The frames can tilt around the hinges in a range of angles±θ (exemplarily ±5 degrees).

FIG. 9 shows isometric views of an embodiment of an EM actuator assembly numbered 900 and capable of θ-φ (double-axis) tilting in: (A) an open-open state, (B) an open-closed state, (C) a closed-open state, and (D) a closed-closed state. Assembly 900 includes two actuators 800 (numbered. 800' and 800") arranged such that their respective ferromagnetic members are orthogonal. This provides double-axis tilting. One tilt motion (θ) is around hinges 808' and the other tilt motion (φ) is around hinges 808". Each actuator can provide at least "end" two positions, i.e. "open" and "closed" (as well as a range of intermediate positions).

FIG. 10 shows isometric views of another embodiment of an EM actuator assembly numbered 1000 which can provide double-axis tilting in: (A) an open-open state and (B) a closed-closed state. Assembly 1000 includes two actuators similar to actuator 400 (numbered. 400' and 400") coupled so as to provided θ-φ (double-axis) tilting. In contrast with the actuators in assembly 900, actuators 400' and 400" are arranges such that their ferromagnetic members are parallel. Note that here plates 1002 and 1004 are used instead of frames to support the ferromagnetic members. FIG. 10A shows the assembly in a relaxed state while FIG. 10B shows it in an operational state. An optical element may be coupled to the assembly at points 1006 and 1007 and each actuator may provide a different displacement Δy along axes 1008 and 1010 such that the result is tilt in two directions. Note that other actuators disclosed above can be similarly combined into two-actuator assemblies.

Single actuators or actuator assemblies disclosed above can be used as drive mechanisms in digital cameras, and in particular in small cameras like those in cellphones. Assemblies such as 900 and 1000 can provide tilt movement of various optical components. They can for example implement OIS by tilting an entire camera module, and/or lateral movement of various components to implement camera Auto Focus (AF) by changing a lens-to-sensor distance.

Figure 11:
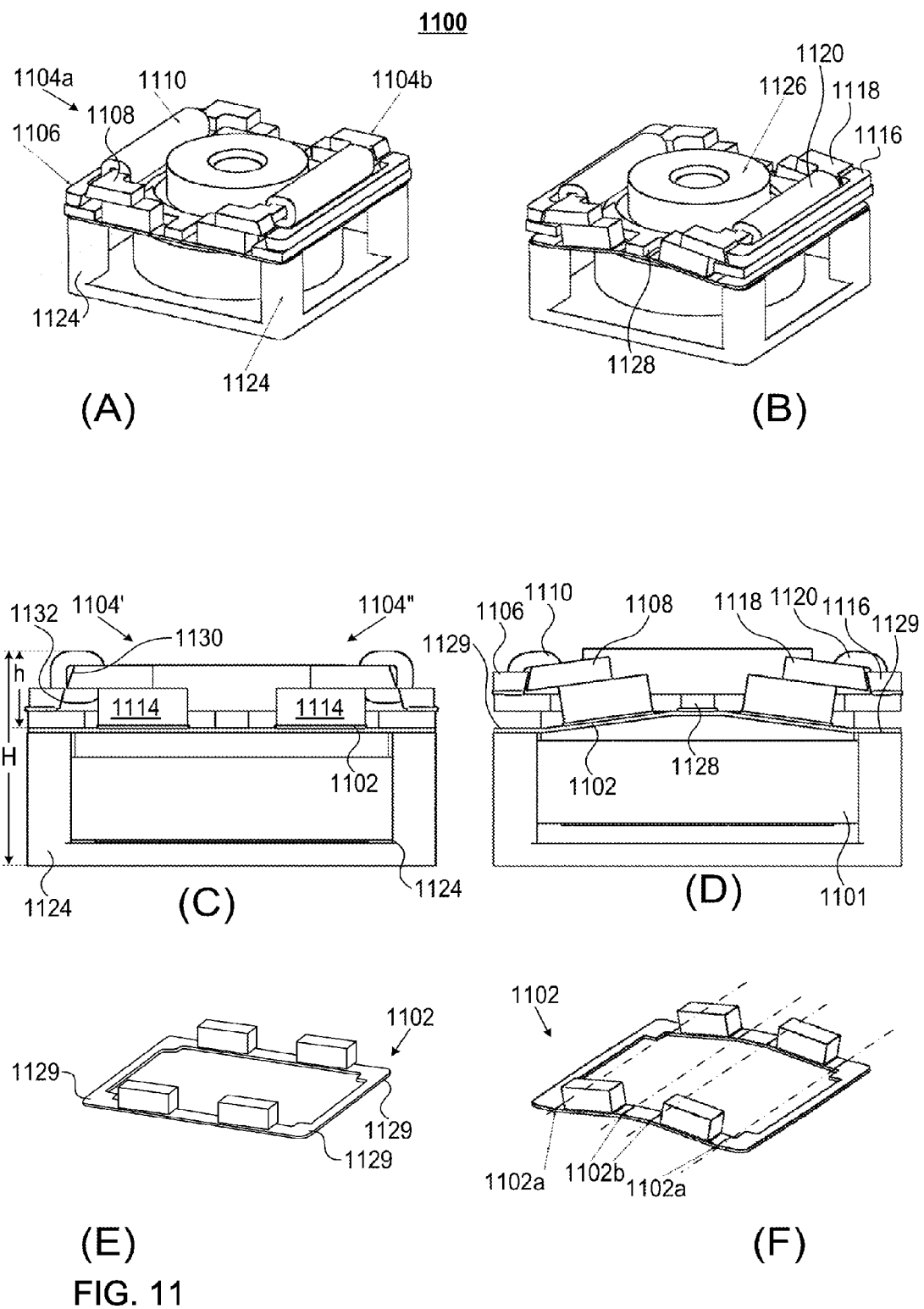
FIG. 11 shows schematically an embodiment of a camera module which includes an actuator assembly coupled to a lens module: (A) isometric view in a first position, (B) isometric view in a second position, (C) a frontal view in the first position, (D) a frontal view in the second position, (E) a flexible band coupling the actuator assembly and the lens module in the first position, and (F) the flexible band in the second position.

FIG. 11 shows schematically an embodiment of a camera module 1100 which includes an actuator assembly coupled to a lens module 1101: (A) isometric view in a first position, (B) isometric view in a second position, (C) a frontal view in the first position, (D) a frontal view in the second position, (E) a flexible band 1102 coupling the actuator assembly and the lens module in the first position, and (F) the flexible band in the second position. The actuator assembly is similar to that in FIG. 10 in the sense that two (first and second) actuators 1104' and 1104″ have respective electromagnets 1104a and 1104b arranged in parallel on opposite sides of the lens module. Actuators 1104′ and 1104″ are exemplarily similar to actuator 600. The total module height (along an optical axis) is indicated by "H" while "h" indicates an actuator height (as in FIG. 6). Exemplarily, H/h>3. Actuator 1104′ includes a first ferromagnetic member 1106 and a second ferromagnetic member 1108 partly surrounded coaxially by a coil 1110 and fixedly attached to flexible band 1102 through spacers 1114. Actuator 1104″ includes a first ferromagnetic member 1116 and a second ferromagnetic member 1118 partly surrounded coaxially by a coil 1120 and fixedly attached to flexible band 1102. Flexible band 1102 may be made of a flexible material (e.g. hard rubber) and provides two spring-like "integral hinges" 1102a and 1102b for each actuator. The ferromagnetic members and hinges have parallel longitudinal axes. A lens barrel 1126 is fixedly attached to the band at two opposite (along a barrel radius) lens holders (or "shoulders") 1128. The band is attached at four corners by spring sections 1129 to pillars 1124, which may be made of hard rubber or similar material. The pillars may tilt slightly to allow tilt by integral hinges 1102. The two hinges allow both Y-displacement and tilt of the second ferromagnetic members (in the electromagnet) of an actuator, as well as displacement of the lens barrel along the Y axis and tilt of the lens barrel around the Z axis.

In use, when both actuators are operated to provide the same displacement, the overlap between opposite operative surfaces of each actuator changes. Exemplarily, in first position (A) shows no overlap between operative surfaces 1130 and 1132 while second position (B) shows a maximal overlap between these surfaces. In the move from the first to the second position, the band flexes around the two hinges, such that it changes shape from a planar state (E) to a flexed state (F). Hinges 1102a are kept stationary in the Y direction by the fixed attachment of the band to the pillars, but allow tilt of the spacers (and of operative surfaces 1130). The two hinges 1102b and the band section therebetween (attached to the lens holder) are therefore displaced along the Y axis and tilting spacers 1114 as well as displacing the lens barrel along the Y axis. The action just described can be used for miniature camera AF, with AF functionality achieved without an increase of the camera module's total height.

In an OIS application, an actuator assembly as described in FIG. 9 or 10 is placed under the camera module so that it can tilt the entire camera module and achieve pitch and yaw correction. Alternatively (for one-axis tilt) this can be done by providing a different displacement by each actuator in an actuator assembly such as that of FIG. 11.

Figure 12:
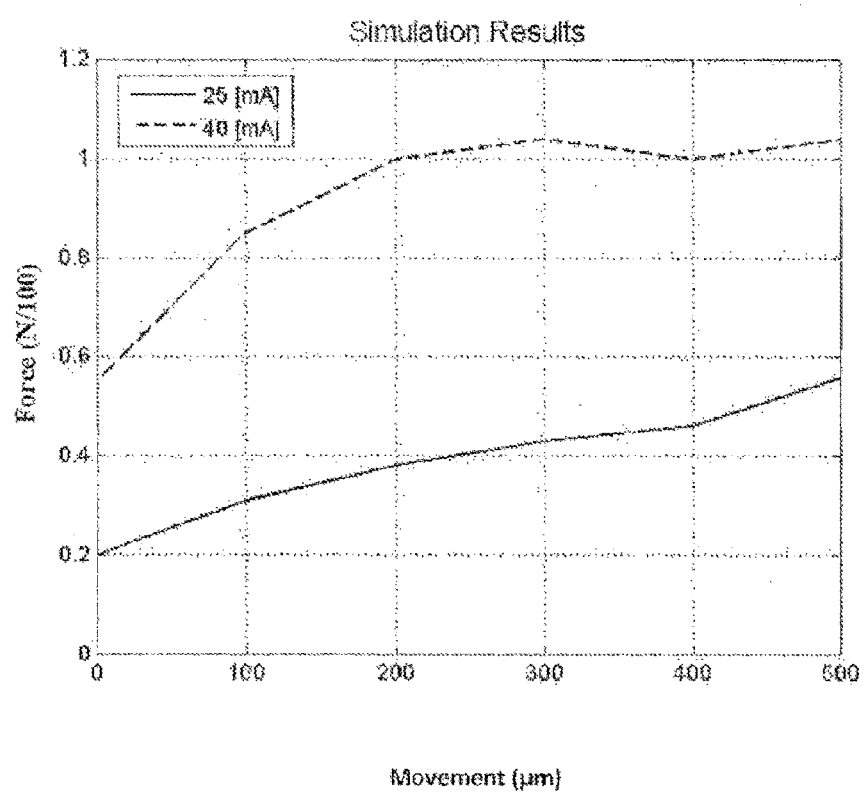
FIG. 12 shows results of a simulation related to the actuator of FIG. 6.

FIG. 12 shows results of a simulation related to the actuator of FIG. 6. The figure shows the EM force as function of the position (and gap size) for N=580 and illustrates that at least for certain currents (e.g. for 40 mA), the force is approximately constant over a large part of an operating range of 500 μm.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

The invention claimed is:

1. An electro-magnetic actuator used to provide a movement of an optical element along an optical axis, the actuator comprising:

a) a first elongated ferromagnetic member surrounded partially by a conductive coil, the first ferromagnetic member having a first longitudinal axis and a first operative surface;
b) a second elongated ferromagnetic member having a second longitudinal axis parallel to the first longitudinal axis and a second operative surface, the first and second ferromagnetic members disposed such that a gap and an overlap are formed between the first and second operative surfaces; and
c) a frame hinge having a third longitudinal axis parallel to the first and second longitudinal axes, the frame hinge used to enable one ferromagnetic member to undergo a tilt motion relative to the other ferromagnetic member when a magnetic force is generated by current in the coil, the tilt motion convertible into a linear displacement of the optical element from a first position to a second position.

2. The actuator of claim 1, wherein each operative surface includes two operative surface sections disposed at two opposing ends of each ferromagnetic member.

3. The actuator of claim 1, wherein the movement between the first and second positions is continuous and provides a third, intermediate position for the optical element.

4. The actuator of claim 1, wherein the first position corresponds to a maximal overlap and wherein the second position corresponds to a minimal overlap.

5. The actuator of claim 1, wherein each ferromagnetic member has an extension along its respective longitudinal axis, the extension of the second ferromagnetic member being greater than the extension of the first ferromagnetic member along the first longitudinal axis, so that the first ferromagnetic member is configured for being at least partially contained within the second ferromagnetic member.

6. The actuator of claim 5, wherein each ferromagnetic member is formed with two operative surfaces spaced and facing away from one another so that when the first ferromagnetic member is at least partially contained within the second ferromagnetic member, the operative surfaces of the first ferromagnetic member face the operative surfaces of the second ferromagnetic member.

7. The actuator of claim 6, wherein each operative surface is in the form of a fork having a plurality of portions spaced apart by respective gaps, each portion being formed with an operative sub-surface.

8. The actuator of claim 2, wherein the gap and the overlap are formed between first and second operative surface sections defined by flat planes perpendicular to an axis originating at the hinge.

9. The actuator of claim 2, wherein the gap and the overlap are formed between first and second operative surface sections defined by curved planes having a common radius originating at the hinge.

10. The actuator of claim 1, wherein one ferromagnetic member is fixedly attached to a first platform, wherein the other ferromagnetic member is fixedly attached to a second platform, and wherein one of the two platforms is movable.

11. The actuator of claim 10, wherein the platforms are non-ferromagnetic.

12. The actuator of claim 11, wherein at least one platform is in the form of a frame.

13. The actuator of claim 12, wherein at least one of the first longitudinal axis and the second longitudinal axis is oriented parallel to the frame.

14. The actuator of claim 13, wherein at least the movable platform is made of a flexible material which is used to form the common hinge as an integral hinge.

15. The actuator of claim 10, wherein the displacement ranges between 0 and approximately 500 µm.

16. The actuator of claim 10, wherein the tilt is in an angle between 0 and approximately 5°.

17. The actuator of claim 10, wherein the optical element is a lens assembly.

18. The actuator of claim 10, combined with another such actuator to form an actuator assembly which provides a double-axis tilt capability.

19. The actuator of claim 18, wherein the two actuators have first ferromagnetic members and coils orthogonal to each other.

20. The actuator of claim 18, wherein the two actuators have first ferromagnetic members and coils parallel to each other.

21. The actuator of claim 18, wherein the actuator assembly is configured for controlling a focus of the optical device.

22. The actuator of claim 18, wherein the actuator assembly is configured for controlling vibration compensation of the optical device.

23. The actuator of claim 10, implemented in a digital camera.

24. The actuator of claim 11, implemented in a digital camera.

25. The actuator of claim 18, implemented in a digital camera.

26. The actuator of claim 23, wherein the actuator has a height h, wherein the digital camera has a height H, and wherein H/h>3.

27. A digital camera module comprising:
a) an optical element; and
b) an actuator assembly comprising two actuators and operative to provide the optical element with double tilt and linear motion capabilities, each actuator comprising:
   i. a first elongated ferromagnetic member surrounded partially by a conductive coil, the first ferromagnetic member having a first longitudinal axis and a first operative surface,
   ii. a second elongated ferromagnetic member having a second longitudinal axis parallel to the first longitudinal axis and a second operative surface, the first and second ferromagnetic members disposed such that a gap and an overlap are formed between the first and second operative surfaces, and
   iii. a frame hinge having a third longitudinal axis parallel to the first and second longitudinal axes, the frame hinge used to enable one ferromagnetic member to undergo a tilt motion relative to the other ferromagnetic member when a magnetic force is generated by current in the coil, the tilt motion convertible into a linear displacement of the optical element from a first position to a second position.

* * * * *